United States Patent
Alam et al.

(10) Patent No.: US 9,777,701 B2
(45) Date of Patent: Oct. 3, 2017

(54) CARPET OF WAVE ENERGY CONVERSION (CWEC)

(71) Applicant: THE REGENTS OF THE UNIVERSITY OF CALIFORNIA, Oakland, CA (US)

(72) Inventors: Mohammad-Reza Alam, Albany, CA (US); Marcus Lehmann, Berkeley, CA (US); Mostafa Shakeri, Emeryville, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 116 days.

(21) Appl. No.: 14/919,709

(22) Filed: Oct. 21, 2015

(65) Prior Publication Data

US 2016/0108883 A1    Apr. 21, 2016

Related U.S. Application Data

(63) Continuation of application No. PCT/US2014/035056, filed on Apr. 22, 2014.

(Continued)

(51) Int. Cl.
*F03B 13/18* (2006.01)
*F03B 13/22* (2006.01)

(52) U.S. Cl.
CPC .......... *F03B 13/187* (2013.01); *F03B 13/188* (2013.01); *F03B 13/1885* (2013.01);
(Continued)

(58) Field of Classification Search
CPC .... F03B 13/188; F03B 13/1885; F03B 13/22; F05B 2240/95; F05B 2240/97;
(Continued)

(56) References Cited

U.S. PATENT DOCUMENTS

| 7,632,041 B2 | 12/2009 | Jean |
| 2008/0050178 A1* | 2/2008 | Erlingsson ............... E02B 3/06 405/21 |

(Continued)

FOREIGN PATENT DOCUMENTS

| KR | 10-1996-0004833 B1 | 4/1996 |
| WO | 2010-004293 A2 | 1/2010 |

OTHER PUBLICATIONS

Korean Intellectual Property Office (KIPO), International Search Report and Written Opinion, Oct. 27, 2014, PCT/US2014/035056, pp. 1-9, with claims searched, pp. 10-17. Counterpart to this application U.S. Appl. No. 14/919,709.

(Continued)

*Primary Examiner* — Jorge Leon, Jr.
(74) *Attorney, Agent, or Firm* — O'Banion & Ritchey LLP; John P. O'Banion

(57) ABSTRACT

A carpet of wave energy conversion (CWEC) device mechanically couples an absorber carpet to one or more energy converters, thereby allowing for wave energy extraction from passing waves. The absorber carpet may be flexible material of a composite material that has a low elastic modulus in a longitudinal direction (to allow for stretching), and a relatively higher elastic modulus in a transverse direction (to better couple energy from wave to converters). Such designs have minimal wave reflections and high efficiencies within a relatively short extent of deployment. The resultant converted useful energy is available as either: 1) mechanical power including direct desalinization or electrical production; or 2) hydraulic power for a number of applications (including hydraulically powered motors supplying power to powered devices including generators), or pumping of the wave medium under pressure to an alternate location for irrigation or energy storage.

36 Claims, 12 Drawing Sheets

Related U.S. Application Data

(60) Provisional application No. 61/814,379, filed on Apr. 22, 2013, provisional application No. 61/974,432, filed on Apr. 2, 2014.

(52) U.S. Cl.
CPC ............ *F03B 13/22* (2013.01); *F05B 2240/95* (2013.01); *F05B 2240/97* (2013.01); *F05B 2280/4003* (2013.01); *F05B 2280/4004* (2013.01); *F05B 2280/5001* (2013.01); *Y02E 10/38* (2013.01)

(58) Field of Classification Search
CPC ...... F05B 2280/4003; F05B 2280/4004; F05B 2280/5001; Y02E 10/38
USPC ................................ 60/497, 505; 290/42, 53
See application file for complete search history.

(56) References Cited

U.S. PATENT DOCUMENTS

| | | | |
|---|---|---|---|
| 2009/0085357 A1 | 4/2009 | Stewart | |
| 2009/0302612 A1* | 12/2009 | Gartner | F03B 17/00 290/54 |
| 2010/0019498 A1* | 1/2010 | Pollack | F03B 13/188 290/53 |
| 2010/0219065 A1 | 9/2010 | Burns | |
| 2010/0314871 A1* | 12/2010 | Jean | F03B 13/185 290/42 |
| 2011/0006532 A1* | 1/2011 | Grey | F03B 13/148 290/53 |
| 2011/0042955 A1* | 2/2011 | Benson | F03B 13/182 290/53 |
| 2012/0285544 A1 | 11/2012 | Westby et al. | |
| 2012/0299303 A1* | 11/2012 | Bellamy | F03B 13/188 290/53 |
| 2013/0009402 A1 | 1/2013 | Williams | |
| 2013/0255247 A1* | 10/2013 | Zakheos | F03B 13/188 60/501 |
| 2014/0023481 A1* | 1/2014 | Drevet | F03D 13/20 415/90 |
| 2014/0319969 A1* | 10/2014 | Denes | F03B 13/14 310/339 |
| 2015/0226176 A1* | 8/2015 | Ryan | F03D 9/008 60/499 |

OTHER PUBLICATIONS

Australian Government IP Australia, Examination Report No. 1 dated Apr. 24, 2017, related Australian patent application No. 2014257189, pp. 1-7, with claims examined, pp. 8-15.

Alam, Mohammad-Reza, "A Flexible Seafloor Carpet for High-Performance Wave Energy Extraction", Proceedings of the ASME 2012 31st International Conference on Ocean, Offshore and Artic Engineering OMAE2012, Jul. 1-6, 2012, Rio de Janeiro, Brazil, pp. 1-8.

\* cited by examiner

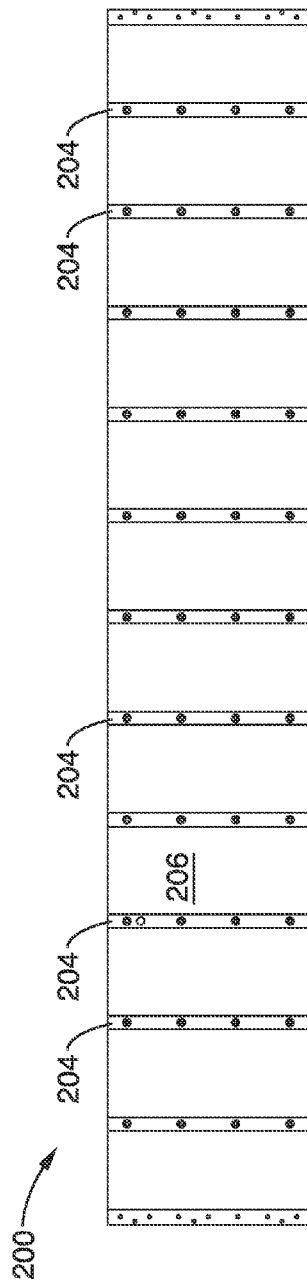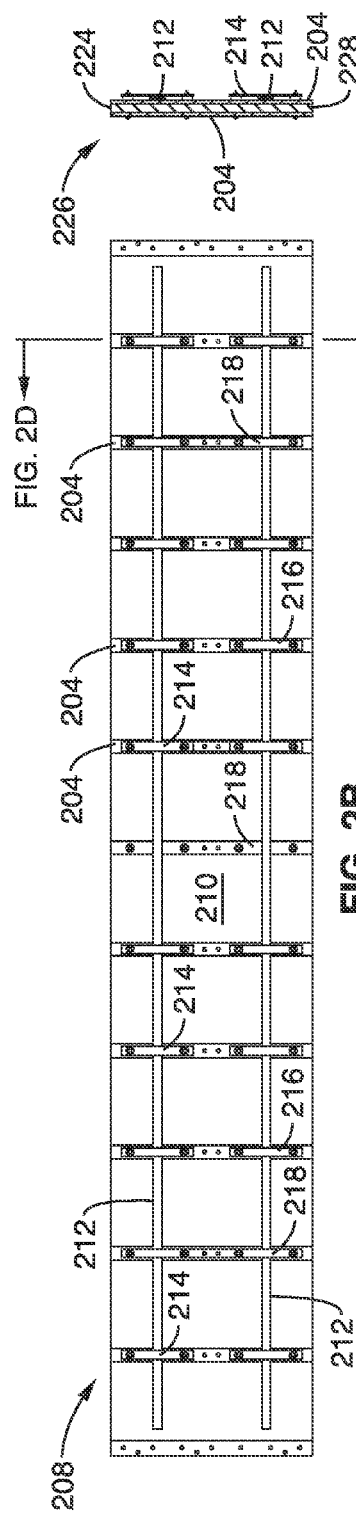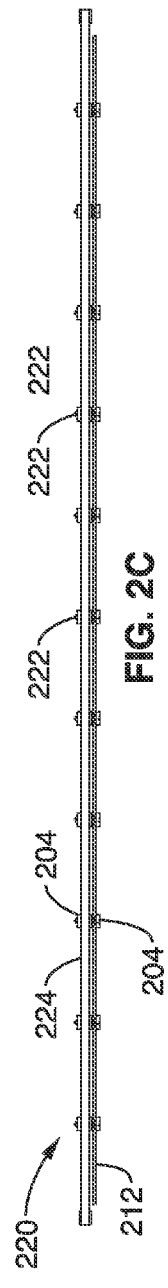

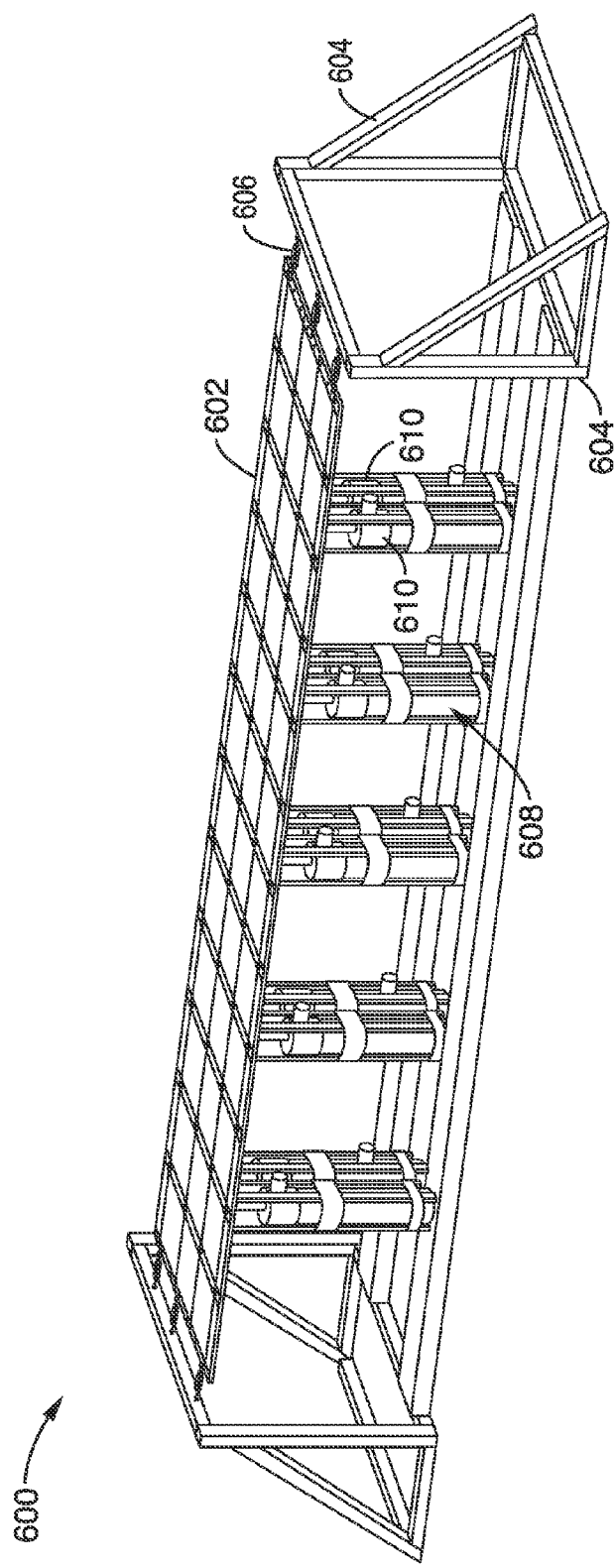

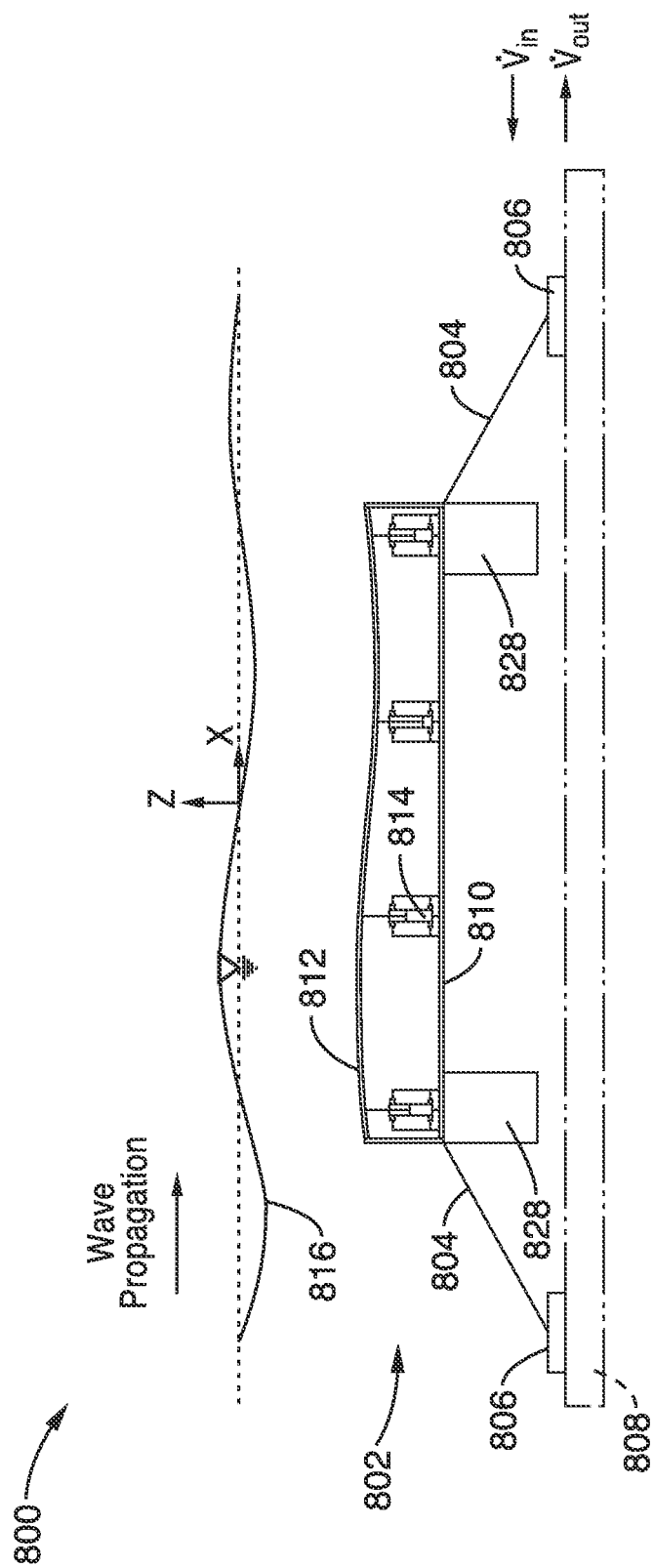

CARPET OF WAVE ENERGY CONVERSION (CWEC)

CROSS-REFERENCE TO RELATED APPLICATIONS

This application is a 35 U.S.C. §111(a) continuation of PCT international application number PCT/US2014/035056 filed on Apr. 22, 2014, incorporated herein by reference in its entirety, which claims priority to, and the benefit of, U.S. provisional patent application Ser. No. 61/814,379 filed on Apr. 22, 2013, and which claims priority to, and the benefit of, U.S. provisional patent application Ser. No. 61/974,432 filed on Apr. 2, 2014. Priority is claimed to each of the foregoing applications.

The above-referenced PCT international application was published as PCT International Publication No. WO 2014/176293 on Oct. 30, 2014, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to wave energy extraction, and more particularly to wave energy extraction using an absorber carpet actuating one or more energy converters.

2. Description of Related Art

Some traditional wave energy extraction systems use windmill-styled blades that are injurious to marine life, and pose significant hazards to shipping. Photovoltaic systems only work when the sun is shining.

BRIEF SUMMARY OF THE INVENTION

A Carpet of Wave Energy Conversion (CWEC) apparatus harvests ocean wave energy and converts it into usable power. This design can be classified as a combination of power conversion technologies using the differential pressure and the relative motion between an incoming wave and absorber carpet, and may be designed for near shore, shallow water, and bottom standing locations either directly on the bottom or suspended over the bottom by pillars. Alternatively, the design may be designed for open water extraction by floating slightly submerged by using gravity mooring. The device may be operated in heave or pitch motion, where the converter's orientation is a combination of attenuator and terminator.

The CWEC comprises a synthetic seabed carpet, a power take off (PTO) system, and a mooring system when placed in non-open-water locations. The energy stored in overtopping waves is damped out by an artificial seabed absorber carpet and converted into working energy using energy converters of various kinds that are mechanically connected to the carpet and a frame. In the case of a hydraulic PTO, the generated hydraulic energy can be used to run a hydro turbine (typically a Francis turbine), supply a reverse osmosis chamber with high pressure, or can be efficiently stored as hydraulic head prior to subsequently being converted into electricity.

Near shore, the CWEC operates completely submerged, and hence imposes minimal danger to vessels and to the sea life (i.e. no mammal entanglement) compared to existing wave energy converters. The absorber carpet is capable of surviving high momentum storm surges and in fact performs even better under very energetic (e.g. stormy) sea conditions. Most existing wave energy converters require shutdown in such storm conditions by going into an idle or other (typically inactive) protective mode.

The CWEC and its variations may also be used to create localized safe havens for fishermen in open seas by floating the entire device, or if implemented on a relatively large scale, to protect shores and harbors against strong storm waves.

The CWEC generates hydraulic power by absorbing and converting wave energy. The extracted hydraulic energy can be used for several applications. The transmitted hydraulic power may be used to run a Francis reaction turbine. The torque generated in this turbine may be used to generate electricity via three-phase alternating circuit synchronous motors or other generators.

The high-pressure seawater may additionally be used to supply a reverse osmosis desalination plant through direct pressurization of sea water, or indirectly through electrical generation and subsequent desalination use. Direct mechanical power may also be used in an energy converter to directly convert the incoming mechanical power to electrical power. Additionally, the harvested energy can be stored without significant losses over time, and later converted to electricity at times with higher electrical power demand and thus higher utility prices. This may be a major advantage over electrical power take off systems of wave energy conversion, photovoltaic, and wind energy.

The CWEC device mechanically may also couple an absorber carpet to one or more energy converters, thereby allowing for energy extraction from waves passing over. The absorber carpet is a water impermeable flexible material, that constructive implementation can comprise a composite material. The designs presented here yield minimal wave reflections and have theoretical efficiencies asymptotically approaching unity within a finite and (relatively) short extent of deployment. Wave energy may be extracted hydraulically or mechanically.

Direct energy extraction may be used to power linear generators, or rotary generators or alternators through use of rack and pinion gearing. Direct energy extraction may be used to mechanically pressurize sea water to the ≥5.5 MPa typically required for most reverse osmosis membranes to function in desalinization plants.

The useful energy output from the energy convert is available as hydraulic power for a number of applications, including direct desalinization, hydraulically powered motors supplying power to powered devices including generators, direct pumping of the wave medium to an alternate location for irrigation or energy storage.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 2A is a top view of an alternative embodiment of a Carpet of Wave Energy Conversion (CWEC) system.

FIG. 2B is a bottom view of the alternative embodiment of the absorber carpet of FIG. 2A.

FIG. 2C is a side view of the alternative embodiment of the absorber carpet of FIG. 2A.

FIG. 2D is an end view of the alternative embodiment of the absorber carpet of FIG. 2A.

FIG. 6A is a perspective view of an experimental CWEC setup.

FIG. 8A is a side view of an elevated CWEC moored by mooring lines to footings disposed in the floor of the body of water.

DETAILED DESCRIPTION OF THE INVENTION

Figure 1A:
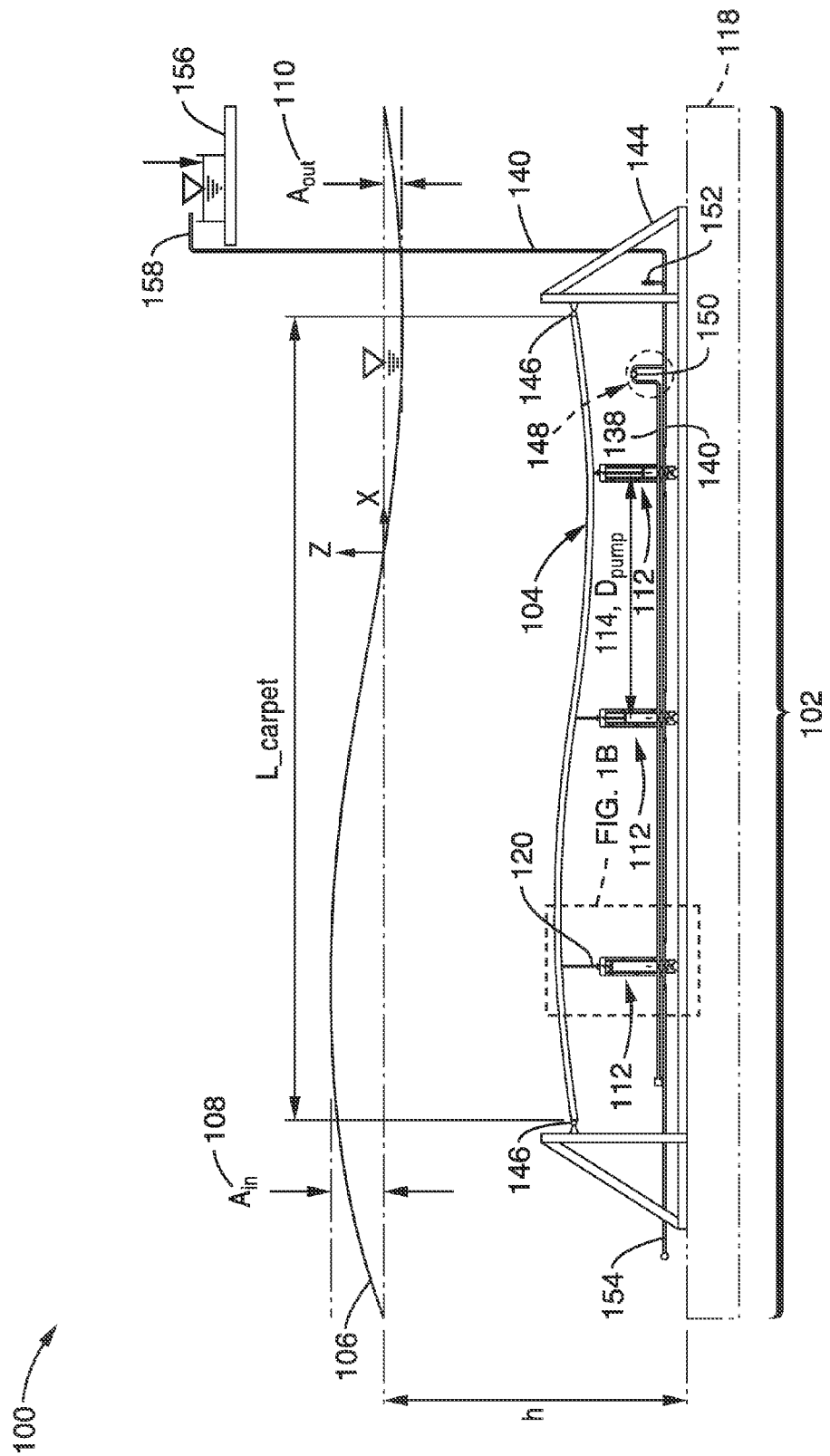
FIG. 1A is a simplified side view embodiment of a 1-D absorber carpet with PTO units in the center of a Carpet of Wave Energy Conversion (CWEC) system.

Refer now to FIG. 1A, which is a simplified side view 100 embodiment of a Carpet of Wave Energy Conversion (CWEC) 102. The CWEC 102 begins with an absorber carpet 104 that interacts with an incoming wave 106 to extract energy from the wave 106. The result is an incoming wave 106 of amplitude $A_{in}$ 108 exiting the CWEC 102 with a diminished output amplitude of $A_{out}$ 110. The difference between the $A_{in}$ 108 and $A_{out}$ 110 relates to the energy extracted from the wave 106 by the CWEC 102.

A wave absorption efficiency may be defined as a ratio $$\frac{E_{in} - E_{out}}{E_{in}}$$

where the outgoing energy $E_{out}$ of the wave 106 is related to $A_{out}$ 110, and the incoming energy $E_{in}$ of the wave is related to $A_{in}$ 108. The CWEC 102 may have very high wave absorption efficiencies, approaching unity.

For the CWEC 102 to generate power, the absorber carpet 104 couples incoming wave 106 energy to one or more (preferably double action) pumps 112 spaced apart by $D_{pump}$ 114. Each pump 112 has one or more check valves 116 used for operation. In the case of a double action pump 112, there would be four check valves 116.

The CWEC 102 may be mounted to ground 118, which in many cases would be a sea floor near a beach.

To actuate the pump 112, a connection 120 is mechanically linked between the absorber carpet 104 and the double action pump 112.

Figure 1B:
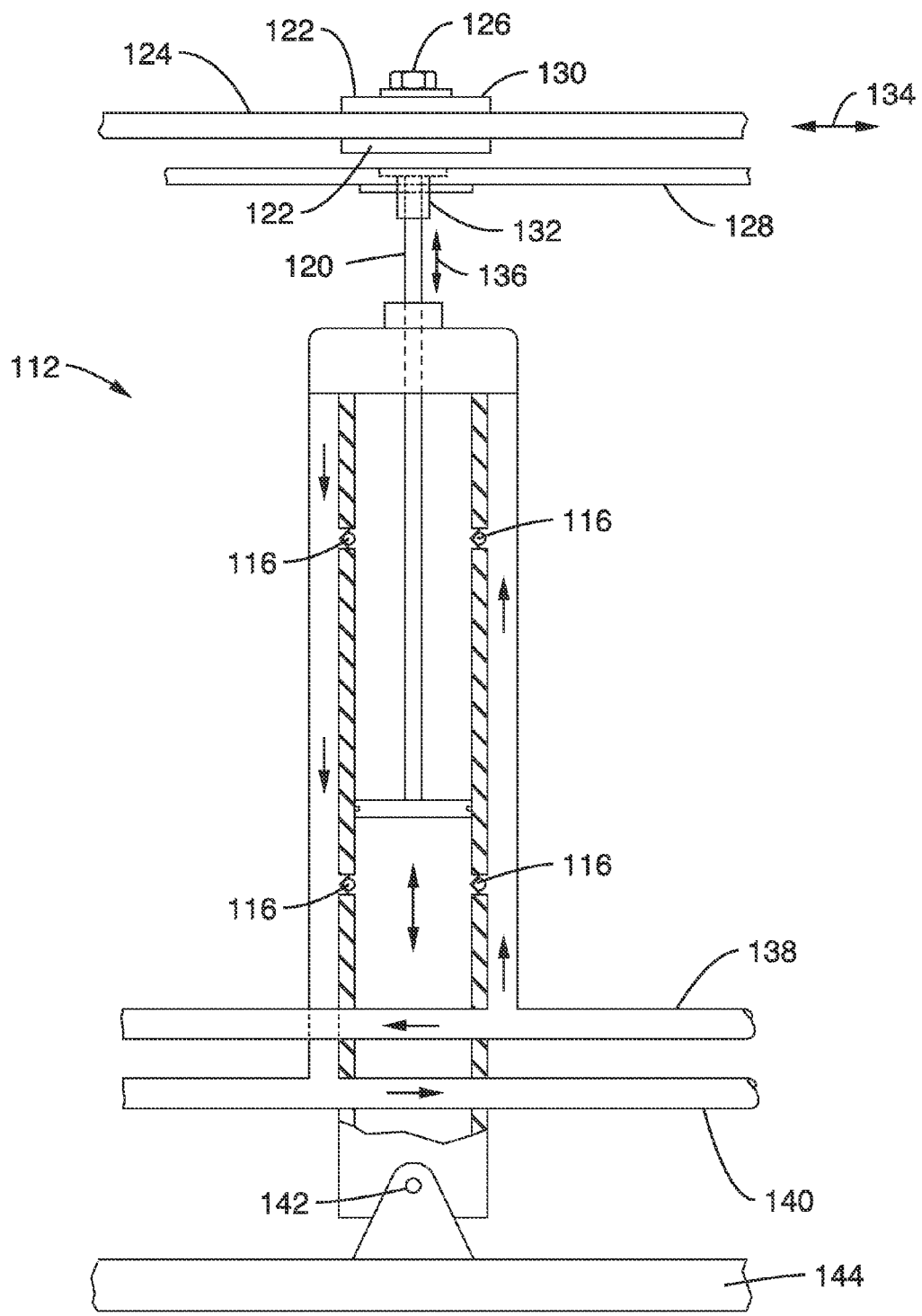
FIG. 1B is a detailed side view of the construction of the 1-D absorber carpet.

Refer now to FIG. 1B, which is a detailed side view of the construction of the absorber carpet 104. Transverse stiffeners 122 act as battens to contain an elastic sheet 124. Such transverse stiffeners 122 are generally fastened through the elastic sheet 124 with one or more fasteners 126.

One or more of the transverse stiffeners 122 are slidably connected (not shown here) to one or more longitudinal members 128. The longitudinal members 128 may be connected with strapping (described below) that uses the same fasteners 126, and may use washers 130.

The longitudinal members 128 are generally flexible, transmitting a stress from one transverse stiffener 122 to the next, but transmitting little in the way of moment. In alternate embodiments, the longitudinal members 128 may consist of a flexible member, a fiberglass bar, and a combination of the foregoing, etc. The longitudinal members 128 are generally resistant to corrosion, rot, or other degradation due to sustained immersion in the medium of the incoming wave 106 (of FIG. 1A). Due to their interactions with the incoming wave 106, the longitudinal members 128 are subject to continuous long term flexure, and are designed for such repetitive stress loadings to last for many years of operation.

The connection 120 between the pump 112 and the absorber carpet 104 may take place at the longitudinal members 128, the transverse stiffeners 122, directly on the elastic sheet 124, or one or more of the foregoing. In one embodiment, the connection 120 takes place proximal to where the longitudinal member 128 crosses the transverse stiffener 122 via a connector 132.

Refer now to both FIG. 1A and FIG. 1B. Since the absorber carpet 104 tends to move back and forth horizontally 134, as well as up and down vertically 136, the connection 120 and the pump 112 allow for such motions. The low pressure inlet line 138 and the high pressure outlet line 140 attaching to the pump 112 may be mounted so as to pivot along the same axis of rotation as a pivoting mount 142. Alternatively, the inlet line 138 and the outlet line 140 may simply flex with the rotational movement of the pump 112.

The pivoting mount 142 is generally attached to a frame 144, which mounts most of the components of the CWEC 102. The frame 144 has pivoting carpet end mounts 146 for connecting the absorber carpet 104 to the frame 144.

In still another embodiment, the connection 120 may be sufficiently flexible so as to accommodate the horizontal 134 movement of the absorber carpet 104, yet not buckling with axial loads operating the pump 112.

A power take off system (PTO) 148 may be interconnected with the inlet line 138 and outlet line 140, allowing for the use of power external to the CWEC 102. In this sense, the PTO 148 may be any hydraulically actuated device 150, or may be a hydraulically actuated rotating device, such as a motor (not shown here). Such a motor may also drive electric power generating equipment (also not shown here).

In still another embodiment, the hydraulically actuated device 150 may be a pressurized or non-pressurized storage container (for instance, reservoir 156) capable of storing hydraulic head for future use through a hydraulic motor (not shown).

The absorber carpet 104 may comprise a composite material that consists partly of the elastic sheet 124 with a low modulus of elasticity and partly of longitudinal members 128 that have a high shear modulus. Both components are connected via a sliding bearing (described later for clarity). The width of the elastic sheet 124 is stiffened by transverse stiffeners 122 located at the top and underneath the elastic sheet 124.

The transverse stiffeners 122 clamp the elastic sheet 124 via fasteners 126, or different fasteners 130, and provide for a mechanical power transfer connection 120 to the pump 112.

The connection 120 directly connects the top of the pump 112 with a longitudinal member 128 at one or more bearing positions of the CWEC 102 along the absorber carpet 104. Ideally, such bearing and pump 112 positions relate to typical incoming wave 106 lengths enjoyed at a particular mounting position of the CWEC 102.

The pump 112 comprises a double acting reciprocating positive displacement pump, otherwise referred to as a double acting pump 112. The connection 120 connects to the pump 112 to the absorber carpet 104. The pivoting mount 142 generally attaches the frame 144 to the bottom of the pump 112 at the CWEC 102.

The CWEC 102 is generally located submerged on the bottom of the ocean or a wave tank. Waves passing over the device generate a pressure field and thus a sinusoidal upwards and downwards oriented load on the absorber carpet 104. The forces are calculated over the pressure on a specific area. The absorber carpet 104 is accelerated and displaced vertically in an oscillating motion. The forces created by the waves on the absorber carpet 104 top surface are transmitted via the transverse stiffeners 122 and the longitudinal members 128 to the pumps 112.

The elastic sheet 124 is clamped at specific sections by transverse stiffeners 122. These transverse stiffeners 122 provide a sliding bearing connection between the elastic sheet 124 and the longitudinal members 128. At the power take off point, the bars creating the connection are connected with a double reacting reciprocating positive displacement pump 112 located underneath the absorber carpet 104.

Along the CWEC 102 wave 106 propagation direction, several pumps 112 are located. The bundled forces of the wave 106 are transmitted to the connection 120 of the pump 112. The pump 112 may generally be a positive displacement pump that comprises a cylindrical piston, a cup seal, a connection 120 (also known as a piston shaft) and four check vales 116.

The lower end of the pump shaft is connected to a cup seal which divides the cylindrical piston of the pump into an upper and lower section. Every section has one inlet and one outlet check valve 116. If the connection 120 pump shaft moves vertically upwards, the lower section of the pump 112 is filled with low pressure water from the supply to inlet line 138. The water filled pump 112 upper section is compressed by the cup seal, thereby pressurizing the water in outlet line 140 and flowing the contents of the upper section into the outlet line 140, thereby performing mechanical work (a force multiplied by a distance). In this manner, wave 106 energy is extracted.

If the pressure in outlet line 140 exceeds a pressure relief valve 152 actuation pressure, then fluid in the high pressure outlet line 140 is released. Such fluid release may be piped to external head storage (for instance reservoir 156) for additional over all CWEC 102 system efficiency.

If the connection 120 shaft of the pump 112 moves vertically downwards, the process described above is performed with the lower and upper section of the pump 112 operationally reversed.

It should be noted that the high pressure outlet line 140 can be arranged as a series of power sources by providing a previous CWEC (not shown here) that routes its pressurized output to a high pressure inlet 154, thereby providing additional flow to the high pressure outlet 140 line.

Furthermore, the high pressure outlet line 140 can be routed externally from the CWEC 102, and simply used to fill a higher elevation (above the wave 106 level) reservoir 156 through discharge 158 of the high pressure outlet line 140. In this manner the hydraulic head of the high pressure outlet line 140 may be stored for peak power demand times or times when wave 106 power input is lower than the required CWEC 102 produced power output.

Finally, it should be noted that FIG. 1A and FIG. 1B both show a low pressure inlet line 138. However, the pump 112 may be alternatively supplied by the ambient medium of the wave 106, e.g. typically fresh or sea water.

Refer now to FIG. 2A, which is a top view 200 of an alternate embodiment of an absorber carpet 202. Here, transverse stiffeners 204 are distributed along the longitudinal direction of the absorber carpet 202 along the top side 206 of the absorber carpet 202.

Refer now to FIG. 2B, which is a bottom view 208 of the alternative embodiment of the absorber carpet 202 of FIG. 2A. Here, one sees still more transverse stiffeners 204 distributed along the longitudinal direction of the absorber carpet 202 along the bottom side 210 of the absorber carpet 202.

On the bottom side 210, there are two longitudinal members 212, which are slidably connected to the bottom 210 transverse stiffeners 204 by sheet metal sleeves 214. Longer sheet metal sleeves 216 provide mounting locations 218 for pump (not shown here) connections.

Refer now to FIG. 2C, which is a side view 220 of the alternative embodiment of the absorber carpet 202 of FIG. 2A. Here, it is apparent that the transverse stiffeners 204 are connected to the absorber carpet 202 via through fasteners 222, constraining an elastic sheet 224 between each set of transverse stiffeners 204.

Refer now to FIG. 2D, which is an end view 226 of the alternative embodiment of the absorber carpet 202 of FIG. 2A. Nearly all items have been previously described above in FIG. 2A through FIG. 2C, however, this view better shows washers 228 spaced between the transverse stiffeners 204 and sheet metal sleeves 214 that allow for sliding movement of the longitudinal members 212.

Figure 3:
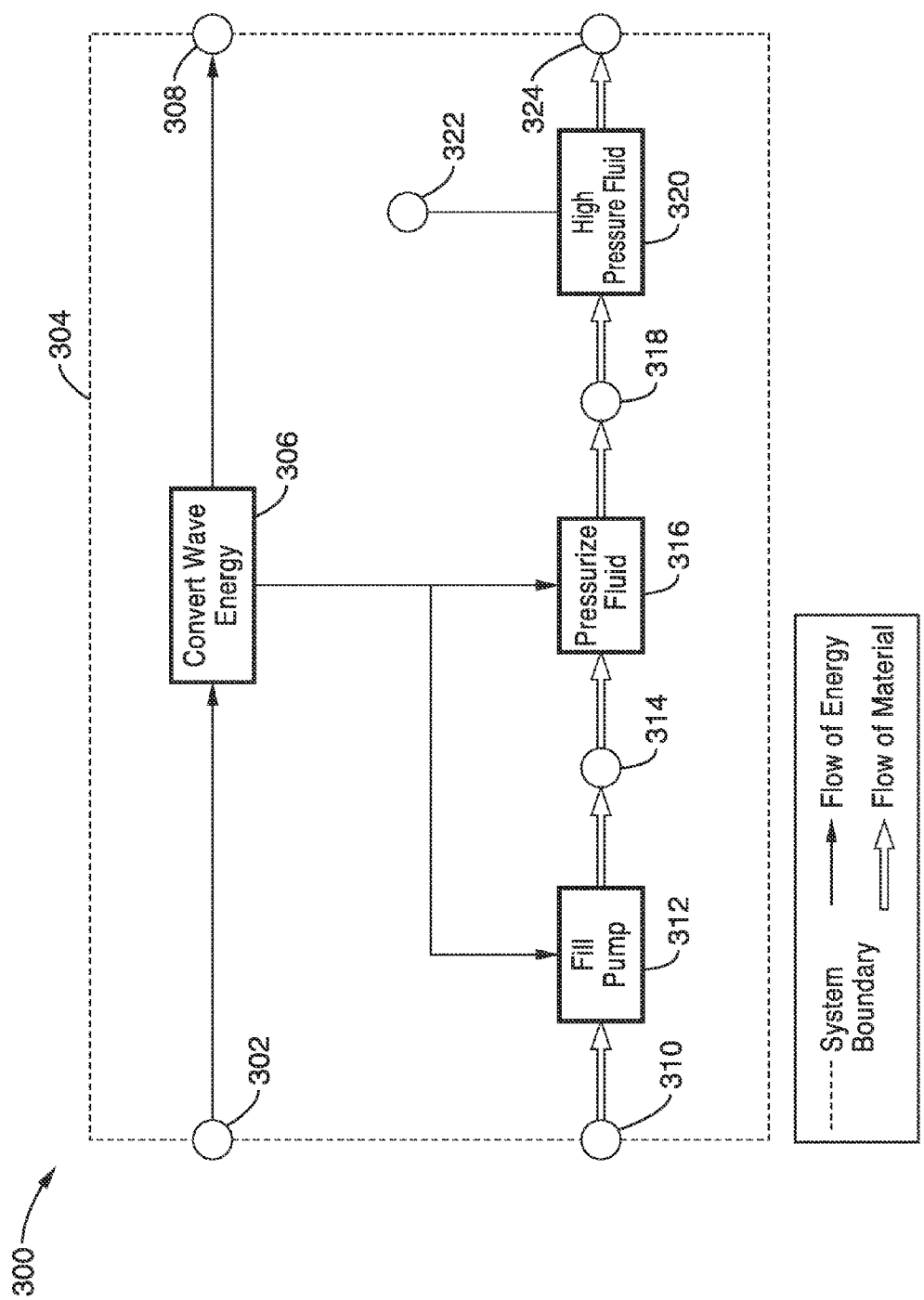
FIG. 3 is a system schematic for the Carpet of Wave Energy Conversion previously described in FIG. 1A through FIG. 1B.

Refer now to FIG. 3, which is a system schematic 300 for the Carpet of Wave Energy Conversion (CWEC) previously described in FIG. 1A through FIG. 1D. From an energy flow standpoint, an impinging wave 302 brings energy into the CWEC system boundary 304. From the impinging wave 302, energy is extracted 306, resulting in a lower energy transmitted wave 308.

Now refer to FIG. 3, as well as previously described FIG. 1A through FIG. 1B. The CWEC 102 system operates using the low pressure inlet line 138 and high pressure outlet line 140 attaching to the pump 112. The inlet line 138 contains low pressure fluid 310 of the ambient medium, typically salt water, although fresh water or other liquids would tend to work equally well. The low pressure fluid 310 is used to fill the pump(s) 312 (112 of FIG. 1A) through the action of the incoming wave 302, resulting in a pump full of low pressure fluid 314. At 316, another incoming wave 302 is converted to wave energy 306 that pressurizes the fluid, thereby creating a relatively higher pressure fluid 318 in the pump, which is output to the high pressure outlet line 140 shown in FIG. 1B. This high pressure fluid 320 is maintained at a pressure below that of a pressure relief valve 322, thereby protecting the apparatus from overpressure situations. The high pressure fluid 320 may be used for power take off purposes as needed external to the system boundary 304 for use as a power source 324.

A check valve (not shown here) may be used to ensure one way flow of the high pressure fluid 320 out of the system boundary 304 for use as a power source 324.

Figure 4:
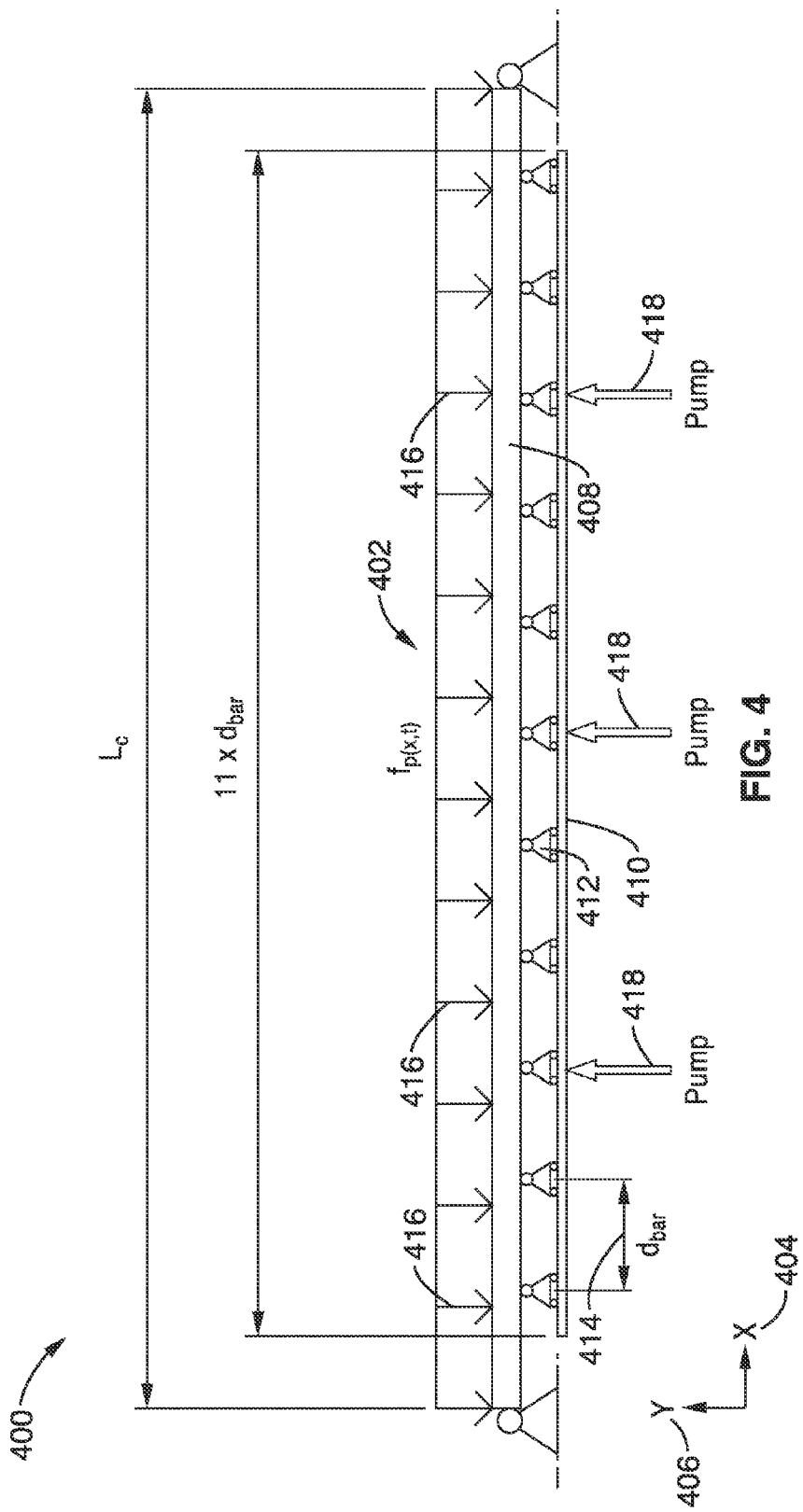
FIG. 4 is a side view of a mechanical model of the composite absorber carpet.

Refer now to FIG. 4, which is a side view 400 of a mechanical model of an anisotropic composite absorber carpet 402. Along an x-axis 404, the absorber carpet 402 is characterized by a low elastic modulus for easy flexure. Along the y-axis 406, a higher shear modulus is desired to avoid nodal building. As these material properties are not fulfilled by a single material, a functional separation of the composite absorber carpet 402 is achieved by creating a composite material.

The two conflicting anisotropic material requirements are met separately by individual materials connected with each other, thereby creating the composite absorber carpet 402. The low elastic modulus requirement is provided by a continuous material 408 with the desired properties with a length of $L_c$.

A different second material 410 that has a high shear modulus is connected via floating bearings 412 with the continuous material 408, located with the distance $d_{bar}$ 414 to each other. Shear forces on the composite absorber carpet 402 bend the second material 410 such that the operational forces will be distributed 416.

Along the x-axis 404 an elastic material behavior, thus a low Young's modulus is desired to allow the continuous material 408 to change its initial length. As a pump connection would exert a y-axis 406 force on the carpet, a sole elastic material would lead to a formation of nodes of the carpet with nodal points at the pump units 418. As the converted energy is directly related to the displacement of the carpet at the position of the pump units 418, no energy would be converted in this case. Therefore, along the y-axis 406 a high bending stiffness in the second material 410 is desired to avoid such nodal building.

Figure 5:
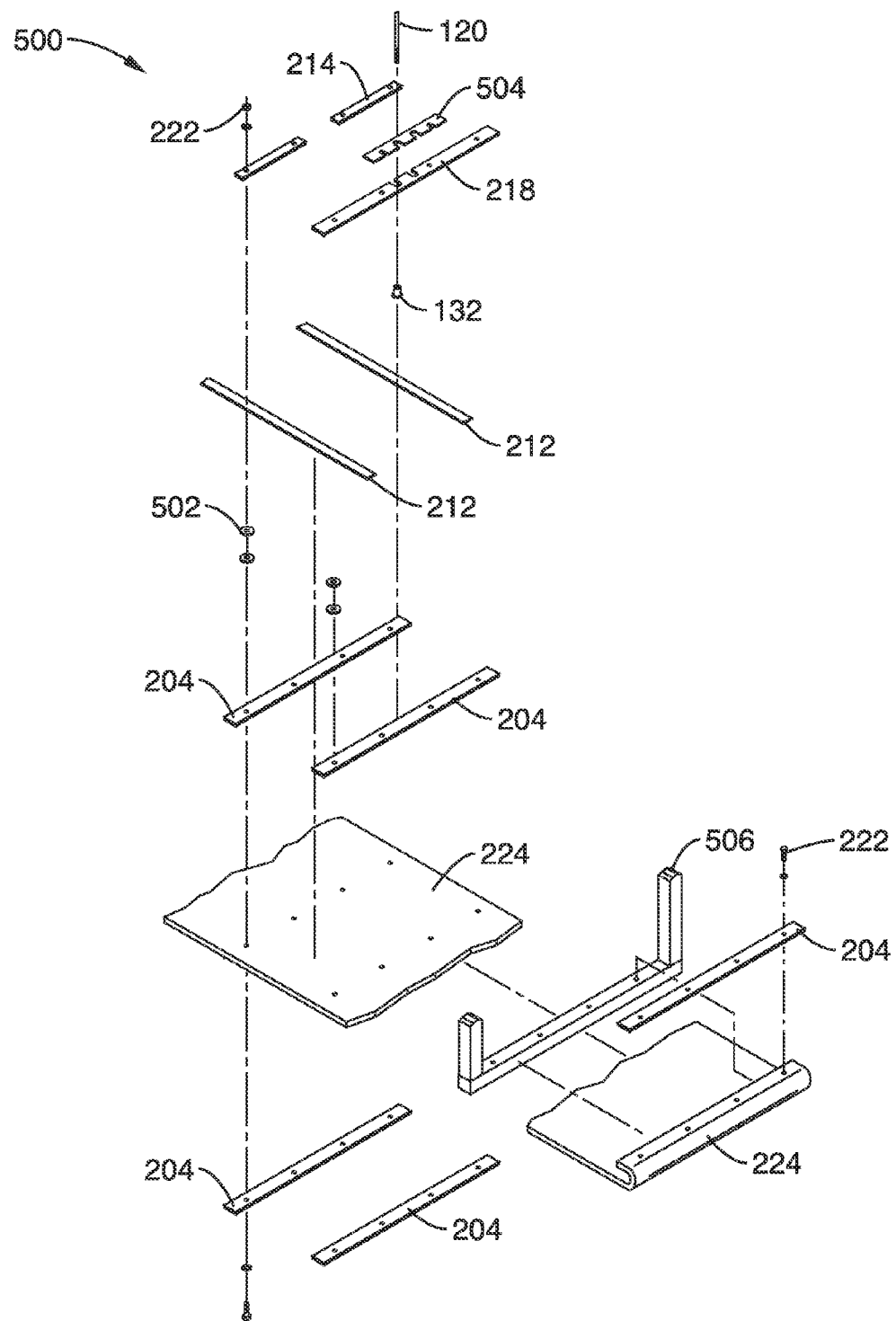
FIG. 5 is an assembly drawing of how the CWEC of FIG. 2A through FIG. 2D is built.

Refer now to FIG. 5, which is an assembly drawing 500 of how the CWEC 102 of FIG. 2A through FIG. 2D is built. Here, a transverse stiffener 204 first attaches to one side of the elastic sheet 224, and then another transverse stiffener 204 attaches to the other side of the elastic sheet 224. One mounting location 218 is spaced above the 204 via spacers 502 to permit longitudinal sliding of 212. The mounting locations 218 also permit attachment of the connector 132 as well as the connection 120 of FIG. 1A through FIG. 1B. The connector 132 is restrained by a mounting plate 504.

In one embodiment, an end of the elastic sheet 224 wraps around a frame 506 portion, and is restrained by another transverse stiffener 204 that is attached via through fasteners 222.

Refer now to FIG. 6A, which is a perspective view 600 of an experimental CWEC setup. The absorber carpet 602 is hooked into the frame 604 on both ends with some pretension added through turnbuckles 606. The five double action pumps 608 are positioned at equal distances in the symmetrical center of the absorber carpet 602 and connected to the carpet as previously shown in FIG. 5. The double action pumps 608 are not connected yet to the consumer pipe at this stage of assembly. In actuality, the double action pumps 608 are formed by a combination of two single action pumps 610 arranged in alternating pump actuation directions.

Figure 6B:
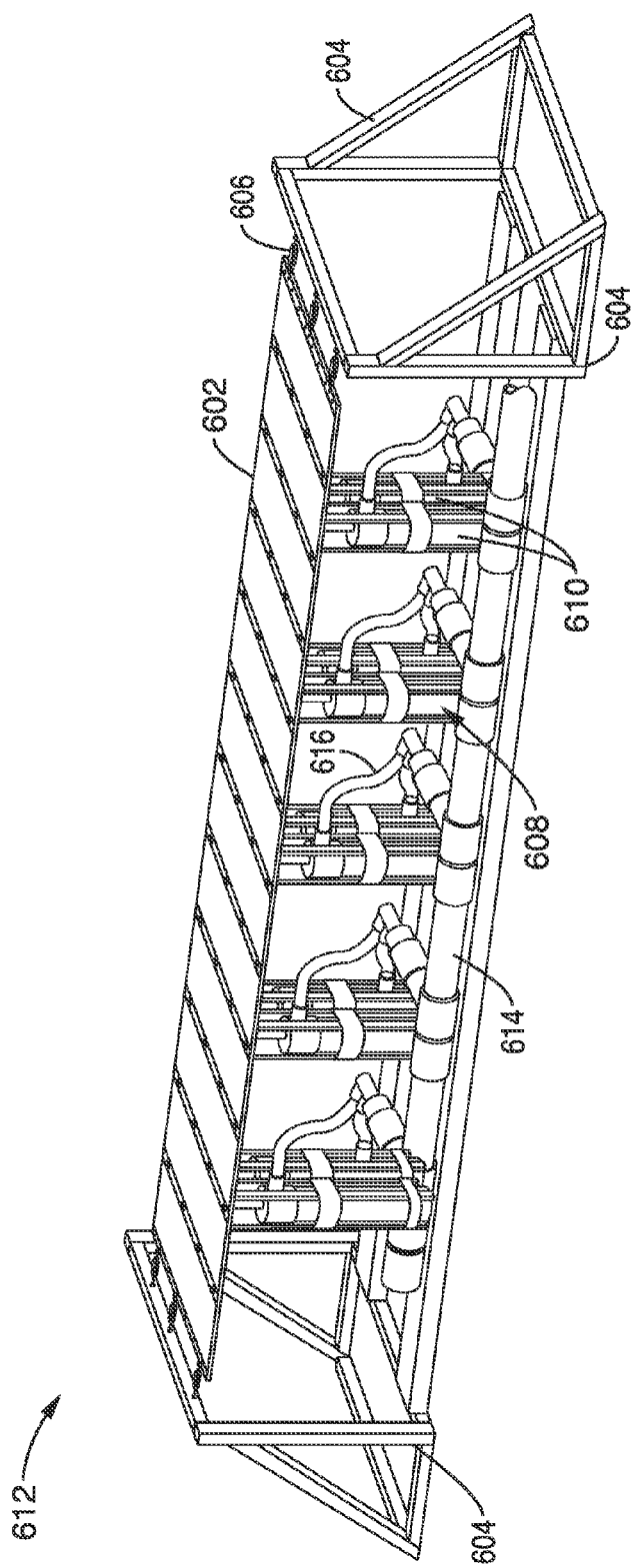
FIG. 6B is a perspective view of the experimental CWEC setup of FIG. 6A with outlets attached.

Refer now to FIG. 6B, which is a perspective view 612 of the experimental CWEC setup of FIG. 6A with outlets attached. Here, the outlet 614 piping has been attached to the various double action pumps 608. Note here that the inlet 616 is open to the ambient medium, significantly simplifying construction.

Figure 7:
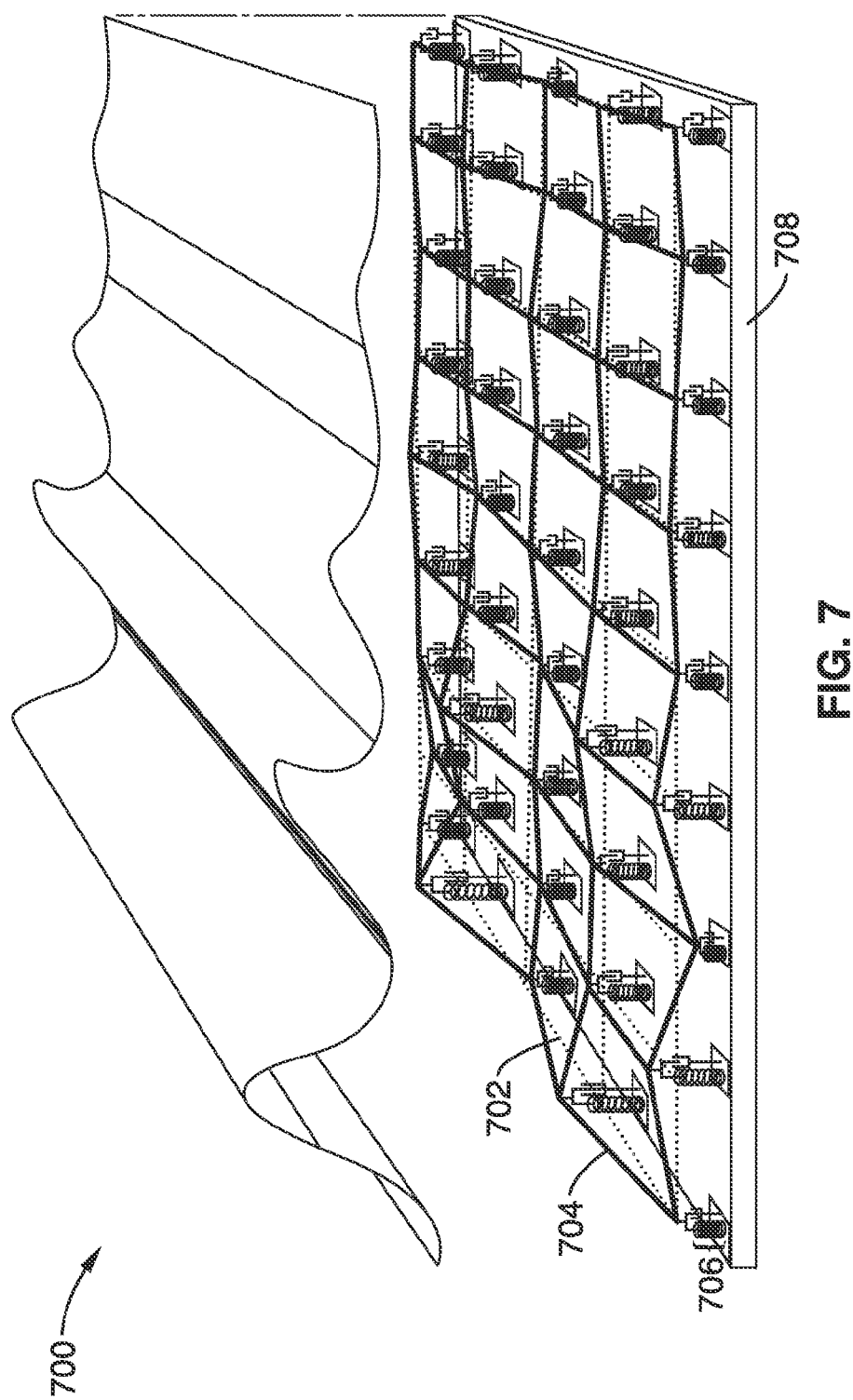
FIG. 7 is a perspective view of a two dimensional CWEC.

Refer now to FIG. 7, which is a perspective view of a two dimensional CWEC 700. Here, a larger absorber carpet 702 (transparent here for clarity) is disposed above a mesh of stiffeners 704 that are coupled to double action pumps 706 that are modeled here as typical mechanical engineering spring/dashpot systems. The artificial seabed carpet or absorber carpet 702 is indicated through lines connecting the double action pumps 706, spanning the impermeable absorber carpet 702 above the double action pumps 706.

These double action pumps 706 symbols represent any mechanical system capable of extracting wave energy through the deflection of the absorber carpet 702. One non-limiting example of such a mechanical system is a double action pump.

The CWEC 102 previously described in FIG. 1A and FIG. 1B was specifically developed for a wave tank with the width of 0.45 m of wave crest perpendicular to propagation direction. However, the two dimensional CWEC 700 may be designed to be modular in length as well as in width. This means that the current ratio of double action pump 706 units per absorber carpet 702 length can be arbitrarily changed according to the desired boundary conditions of the environment for which the device is designed for.

For example in an application in the ocean, where wave lengths in the order of 100 m may occur, the length of the absorber carpet 702 can be adjusted to a full, half, or quarter wave length. For such an absorber carpet 702 length, the number of PTO units will significantly increase, as shown here with 9 double action pumps 706 in a longitudinal direction, and 5 double action pumps 706 in a transverse direction, yielding a total of 45 double action pumps 706.

As the energy transmitted in ocean waves is quantified in kW per meter wave crest, the area of the two dimensional CWEC 700 device defines the amount of energy to which it is exposed. Therefore the spatial disposition of double action pumps 706 units/m$^2$ wave crest perpendicular to the wave propagation direction can be arbitrarily adjusted as desired.

The CWEC 700 of FIG. 7 shows a version of the CWEC 700 located at the ocean floor 708 with multiple double action pump 706 units perpendicular to the wave propagation direction, along one ocean wave crest.

The CWEC 700 combines the advantages of a point absorber, an attenuator, and a terminator: It is wave direction independent, has a high absorption efficiency, and can be exposed to high wave energy flux with its flexible absorber carpet spread perpendicular to the wave-propagation direction. The ability to cancel waves can be used to create safe zones in the ocean, prevent erosion and protect harbors. Secondly, the CWEC 700 functions primarily as an energy conversion device that creates seawater at high pressure.

The high pressure water can be used to generate electricity, directly used for desalination, and used for the distribution of fresh water through direct pumping of the double action pumps 706. High pressure water can additionally supply pumped-storage hydroelectric power plants, which are a very efficient way to balance the electrical grid.

Refer now to FIG. 8A, which is a side view 800 of an elevated CWEC 802 moored by mooring lines 804 to footings 806 disposed in the floor 808 of the body of water. Here, a frame 810 connects to the mooring lines 804 retaining the CWEC 802. An absorber carpet 812 has energy extracted through one or more pumps 814 attached on one end to the absorber carpet 812 and on the other end to the frame 810. In this manner, energy from the incoming wave 816 may be extracted by the CWEC 802.

Figure 8B:
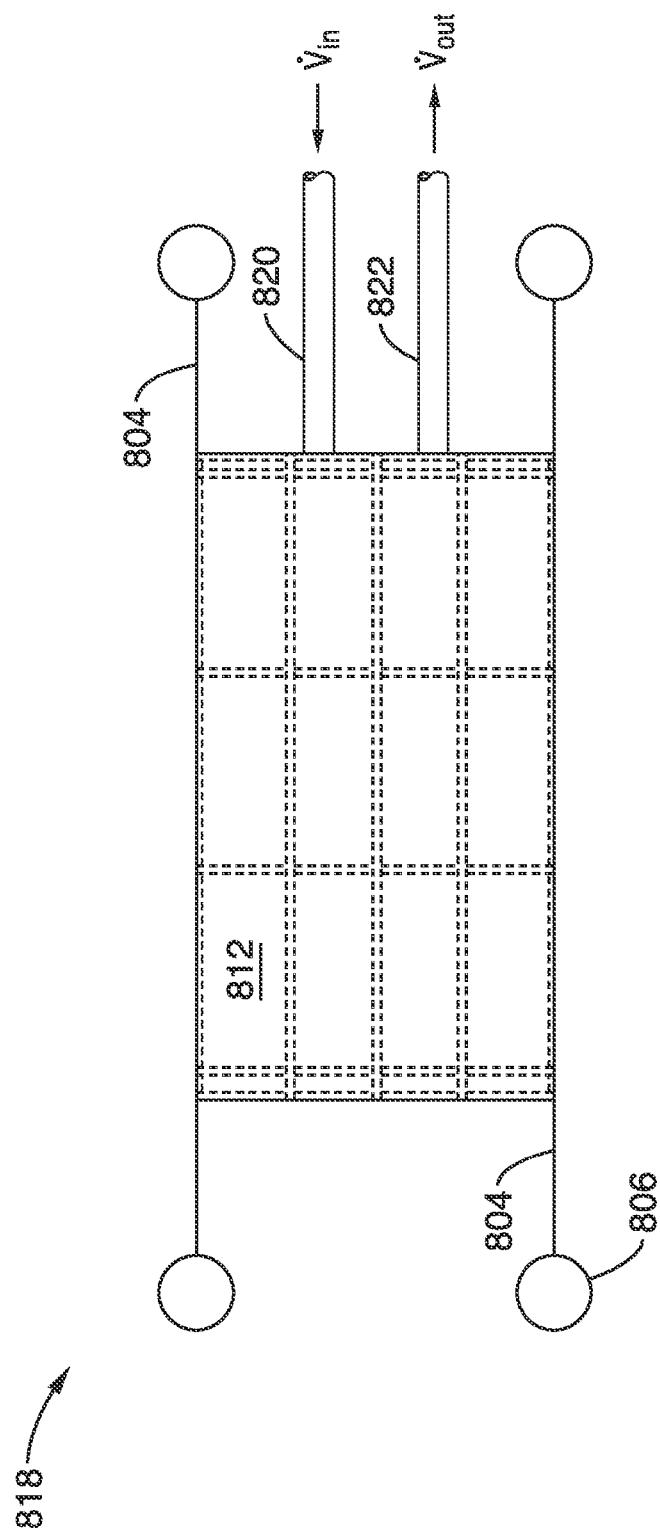
FIG. 8B is a top view of the CWEC of FIG. 8A.

Refer now to FIG. 8B, which is a top view 818 of the CWEC 802 of FIG. 8A. Here, it is easier to observe that mooring lines 804 attach from the footings 806. Also, observe that the inlet lines 820 and outlet lines 822 provide incoming and outgoing flux from the pumps 814 of FIG. 8A.

Figure 8C:
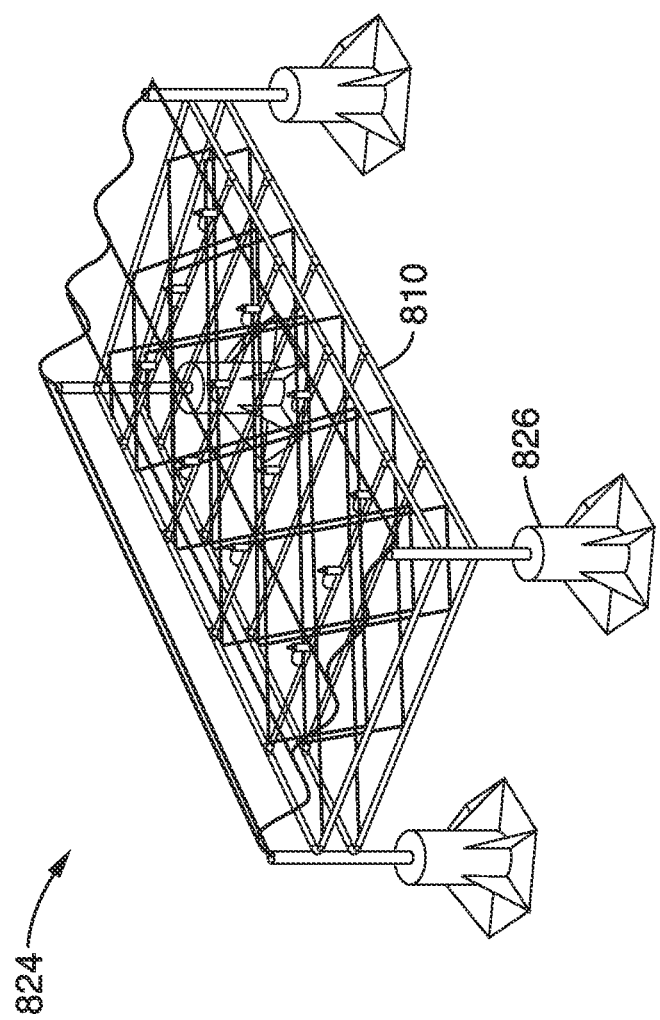
FIG. 8C is a variation on the design of FIG. 8A and FIG. 8B, with footings directly connecting to the frame.

Refer now to FIG. 8C, which is a variation 824 on the design of FIG. 8A and FIG. 8B, here with footings 826 directly connecting to the frame 810.

Referring back to FIG. 8A, it is seen that floats 828 may be attached to the frame 810 to provide flotation to the CWEC 802, and that by lengthening the mooring lines 804, the CWEC 802 may be floated to the surface, allowing for initial installation, as well as subsequent repair of the CWEC 802.

In the preceding FIG. 1A through FIG. 8C, it is seen that there are many examples of means for extracting energy from waves. These may be 1-D systems, as shown in FIG. 1A through 2D, or 2-D systems, as shown in FIG. 7 through FIG. 8C, without limitation. In all cases, an absorber carpet operates to interact with incoming waves to extract mechanical energy from the wave through the operation of energy converters. Typically, such energy converters are pumps, but they may also be directly driven hydraulic actuators, desalinization components, reverse osmosis (and typically higher pressure) pumps, direct drive generators or alternators, and the like. Herein, a pump acts as an energy converter.

Without limitation, any method by which mechanically input energy through the work done on a connector (120 of FIG. 1A) serves as a means for extracting of the wave energy.

From the discussion above it will be appreciated that the invention can be embodied in various ways, including the following:

1. A wave energy conversion apparatus, comprising: (a) an absorber carpet comprising a first end and a second end; and (b) a plurality of energy converters, each energy converter coupled to the absorber carpet; (c) wherein an incoming wave that interacts with the absorber carpet causes a movement of the absorber carpet, thereby operating one or more of the plurality of energy converters.

2. The apparatus of any preceding embodiment, wherein at least one of the ends of the absorber carpet comprises: (a) one or more transverse stiffeners attached to an elastic sheet along a transverse extent; (b) one or more fasteners that fastens the elastic sheet to the one or more transverse stiffeners; (c) one or more through holes that pass through the one or more transverse stiffeners, as well as through the elastic sheet; and (d) one or more turnbuckles attached to the through hole at one end, and substantially fixed to a frame at another end; (e) where the turnbuckles tension the elastic sheet.

3. The apparatus of any preceding embodiment, wherein the absorber carpet comprises: (a) one or more transverse stiffeners attached to an elastic sheet along a transverse extent; (b) wherein the attachment between the transverse stiffeners and the elastic sheet is selected from one or more of a group of attachments consisting of: a mechanical attachment, a threaded attachment, a glued attachment, a cross linked attachment of the elastic sheet, a woven attachment, and an integral attachment of the transverse stiffener in the elastic sheet.

4. The apparatus of any preceding embodiment, wherein at least one of the ends of the absorber carpet comprises: (a) an elastic sheet mounted to a frame; (b) wherein the elastic sheet is tensioned by a preloaded stretch of the elastic sheet as it is attached to the frame.

5. The apparatus of any preceding embodiment, wherein the absorber carpet comprises a material selected from a group of materials consisting of: a flexible material; a water impermeable flexible material; a rubber; a urethane; a polyvinyl chloride; an acrylonitrile butadiene styrene (ABS); a nylon; and a polyoxymethylene.

6. The apparatus of any preceding embodiment, wherein one or more of the energy converters are selected from a group of energy converters consisting of: a single action hydraulic pump; a double action hydraulic pump; a linear electrical generator; a rack and pinion that drives a generator; and a rack and pinion that drives an alternator.

7. The apparatus of any preceding embodiment, wherein one or more of the energy converters directly pressurize a source water for reverse osmosis purification of the source water into a purified water output.

8. The apparatus of any preceding embodiment, wherein the absorber carpet comprises: (a) an elastic sheet comprising a longitudinal and a transverse extent; (b) one or more transverse stiffeners connected to the elastic sheet along the transverse extent; (c) one or more longitudinal members attached to at least two of the transverse stiffeners.

9. The apparatus of any preceding embodiment, wherein the longitudinal members are slidably attached to at least two of the transverse stiffeners.

10. The apparatus of any preceding embodiment, wherein the transverse stiffeners are selected from one or more of a group of stiffeners consisting of: a bar; a metal slat; a stainless steel slat; an epoxy slat; a fiberglass slat; a carbon fiber reinforced epoxy slat; a plastic slat; a composite slat; and a wooden slat.

11. The apparatus of any preceding embodiment, wherein the elastic sheet is selected from one or more of a group of elastic materials consisting of: a rubber; a polymer; an elastomer; and a material with a Young's modulus selected from a group of Young's moduli consisting of: ≤0.01 GPa, ≤0.1 GPa, ≤0.3 GPa, and ≤1.0 GPa.

12. The apparatus of any preceding embodiment, wherein the longitudinal member is selected from a group of materials having a Young's modulus consisting of: ≥1.0 GPa, ≥3.0 GPa, ≥10.0 GPa, and ≥30.0 GPa.

13. The apparatus of any preceding embodiment, wherein the wave energy conversion apparatus has a wave absorption efficiency selected from a group of absorption efficiencies consisting of: ≥40%; ≥60%; ≥80%; ≥90%; and ≥98%.

14. A method of extracting wave energy, comprising: (a) providing one or more waves; (b) providing a wave energy conversion apparatus, comprising: (i) an absorber carpet comprising a first end and a second end; and (ii) a plurality of energy converters, each energy converter operatively coupled to the absorber carpet; (iii) wherein the wave that passes over the absorber carpet causes a movement of the absorber carpet, thereby operating one or more of the plurality of energy converters; and (c) extracting wave energy from the one or more waves with the wave energy conversion apparatus through operation of one or more of the plurality of energy converters.

15. The method of any preceding embodiment, wherein the wave energy conversion apparatus has a wave energy efficiency selected from a group of efficiencies consisting of: ≥70%, ≥80%, ≥90%, ≥95%, and ≥98%.

16. The method of any preceding embodiment, wherein extracting the wave energy comprises driving one or more of energy converters.

17. The method of any preceding embodiment, wherein the wave substantially comprises fresh water or salt water.

18. The method of any preceding embodiment, wherein at least one of the ends of the absorber carpet comprises: (a) one or more transverse stiffeners attached to an elastic sheet along a transverse extent; (b) one or more fasteners that fastens the elastic sheet to the one or more transverse stiffeners; (c) one or more through holes that pass through the one or more transverse stiffeners, as well as through the elastic sheet; and (d) one or more turnbuckles attached to the through hole at one end, and substantially fixed to a frame at another end; (e) wherein the turnbuckle tensions the elastic sheet.

19. The method of any preceding embodiment, wherein one or more of the energy converters are selected from a group of pumps consisting of: a single acting pump; and a double acting pump.

20. The method of any preceding embodiment, wherein the absorber carpet comprises: (a) an elastic sheet comprising a longitudinal and a transverse extent; (b) one or more transverse stiffeners connected to the elastic sheet along the transverse extent; and (c) one or more longitudinal members attached to at least two of the transverse stiffeners.

21. The method of any preceding embodiment, wherein the longitudinal members are slidably attached to at least two of the transverse stiffeners.

22. The method of any preceding embodiment, wherein the longitudinal members are selected from one or more of a group of members consisting of: a flexible member and a fiberglass bar.

23. The method of any preceding embodiment, wherein the transverse stiffeners are selected from one or more of a group of stiffeners consisting of: a bar; a metal slat; a stainless steel slat; an epoxy slat; a fiberglass slat; a carbon fiber reinforced epoxy slat; a plastic slat; a composite slat; and a wooden slat.

24. The method of any preceding embodiment, wherein the elastic sheet is selected from a group of elastic materials consisting of: a rubber, a polymer, and a material with a Young's modulus selected from a group of Young's moduli consisting of: ≤0.01 GPa, ≤0.1 GPa, ≤0.3 GPa, and ≤1.0 GPa.

25. The method of any preceding embodiment, wherein the longitudinal member is selected from a group of materials having a Young's modulus consisting of: ≥1.0 GPa, ≥3.0 GPa, ≥10.0 GPa, and ≥30.0 GPa.

26. A wave energy conversion apparatus, comprising: (a) an absorber carpet comprising a first end and a second end; (b) a plurality of energy converters, each energy converter coupled to the absorber carpet; and (c) means for extracting energy from a wave that interacts with the absorber carpet through operation of one or more of the plurality of energy converters.

27. The apparatus of any preceding embodiment, wherein at least one of the ends of the absorber carpet comprises: (a) one or more transverse stiffeners attached to an elastic sheet along a transverse extent; (b) one or more fasteners that fastens the elastic sheet to the one or more transverse stiffeners; (c) one or more through holes that pass through the one or more transverse stiffeners, as well as through the elastic sheet; and (d) one or more turnbuckles attached to the through hole at one end, and substantially fixed to a frame at another end; (e) where the turnbuckle tensions the elastic sheet.

28. The apparatus of any preceding embodiment, wherein one or more of the energy converters are selected from a group of energy converters consisting of: a single action hydraulic pump; a double action hydraulic pump; a linear electrical generator; a rack and pinion that drives a generator; and a rack and pinion that drives an alternator.

29. The apparatus of any preceding embodiment, wherein one or more of the energy converters directly pressurize a source of water for reverse osmosis purification of the source of water into a purified water output.

30. The apparatus of any preceding embodiment, wherein the absorber carpet comprises: (a) an elastic sheet comprising a longitudinal and a transverse extent; (b) one or more transverse stiffeners connected to the elastic sheet along the transverse extent; and (c) one or more longitudinal members attached to at least two of the transverse stiffeners.

31. The apparatus of any preceding embodiment, wherein the longitudinal members are slidably attached to at least two of the transverse stiffeners.

32. The apparatus of any preceding embodiment, wherein the longitudinal members are selected from one or more of a group of members consisting of: a flexible member and a fiberglass bar.

33. The apparatus of any preceding embodiment, wherein the longitudinal members are selected from a group of materials having a Young's modulus consisting of: ≥1.0 GPa, ≥3.0 GPa, ≥10.0 GPa, and ≥30.0 GPa.

34. The apparatus of any preceding embodiment, wherein the transverse stiffeners are selected from one or more of a group of stiffeners consisting of: a bar, an aluminum slat, a stainless steel slat, a fiberglass bar, a plastic slat, and a wooden slat.

35. The apparatus of any preceding embodiment, wherein the elastic sheet is selected from a group of elastic materials comprising: a rubber, a polymer, and a material with a Young's modulus selected from a group of Young's moduli consisting of: ≤0.01 GPa, ≤0.1 GPa, ≤0.3 GPa, and ≤1.0 GPa.

36. The apparatus of any preceding embodiment, wherein the longitudinal member is selected from a group of materials having a Young's modulus consisting of: ≥1.0 GPa, ≥3.0 GPa, ≥10.0 GPa, and ≥30.0 GPa.

37. The apparatus of any preceding embodiment, wherein the means for extracting energy from the wave has a wave energy efficiency selected from a group of efficiencies consisting of: ≥70%, ≥80%, ≥90%, ≥95%, and ≥98%.

38. The apparatus of any preceding embodiment, wherein the means for extracting energy from the wave comprises: (a) a frame movably attached to the first and second ends of the absorber carpet; (b) one or more attachments to a moor point on a moored end, and to the frame on another end; and (c) the moor point selected from a group of moor points consisting of: a floor of a body of water; a platform connected to one or more footings in a floor of a body of water; and a floating platform.

39. The apparatus of any preceding embodiment, wherein: (a) the attachments allow for movement of the frame from below a surface of the body of water to the surface of the body of water; and (b) wherein the wave propagates within the body of water.

40. The apparatus of any preceding embodiment, wherein the means for extracting energy comprises: (a) a frame; and (b) one or more energy converters movably attached to the frame at a frame end, and to the absorber carpet at a carpet end.

41. A wave energy conversion apparatus, comprising: (a) an absorber carpet comprising a first end and a second end; and (b) a plurality of pumps, each pump operatively coupled to the absorber carpet; (c) wherein a wave that passes over the absorber carpet causes a movement of the absorber carpet, thereby operating one or more of the plurality of pumps.

42. The apparatus of any preceding embodiment, wherein at least one of the ends of the absorber carpet comprises: (a) one or more transverse stiffeners attached to an elastic sheet along a transverse extent; (b) one or more fasteners that fastens the elastic sheet to the one or more transverse stiffeners; (c) one or more through holes that pass through the one or more transverse stiffeners, as well as through the elastic sheet; and (d) one or more turnbuckles attached to the through hole at one end, and substantially fixed to a frame at another end; (e) wherein the turnbuckle tensions the elastic sheet.

43. The apparatus of any preceding embodiment, wherein one or more of the pumps are double acting.

44. The apparatus of any preceding embodiment, wherein the absorber carpet comprises: (a) an elastic sheet comprising a longitudinal and a transverse extent; (b) one or more transverse stiffeners connected to the elastic sheet along the transverse extent; (c) one or more longitudinal members attached to at least two of the transverse stiffeners.

45. The apparatus of any preceding embodiment, wherein the longitudinal members are slidably attached to at least two of the transverse stiffeners.

46. The apparatus of any preceding embodiment, wherein the longitudinal members are selected from one or more of a group of members consisting of: a flexible member and a fiberglass bar.

47. The apparatus of any preceding embodiment, wherein the transverse stiffeners are selected from one or more of a group of stiffeners consisting of: a bar, an aluminum slat, a stainless steel slat, a fiberglass bar, a plastic slat, and a wooden slat.

48. The apparatus of any preceding embodiment, wherein the elastic sheet is selected from a group of elastic materials comprising: a rubber, a polymer, and a material with a Young's modulus selected from a group of Young's moduli consisting of: $\leq 0.01$ GPa, $\leq 0.1$ GPa, and $\leq 0.3$ GPa.

49. The apparatus of any preceding embodiment, wherein the longitudinal member is selected from a group of materials having a Young's modulus consisting of: $\geq 1.0$ GPa, $\geq 3.0$ GPa, $\geq 10.0$ GPa, and $\geq 30.0$ GPa.

50. The apparatus of any preceding embodiment, wherein the wave energy conversion apparatus has a wave energy efficiency selected from a group of efficiencies consisting of: $\geq 70\%$, $\geq 80\%$, $\geq 90\%$, $\geq 95\%$, and $\geq 98\%$.

51. A method of extracting wave energy, comprising: (a) providing one or more waves; (b) providing a wave energy conversion apparatus, comprising: (i) an absorber carpet comprising a first end and a second end; and (ii) a plurality of pumps, each pump operatively coupled to the absorber carpet; (iii) wherein the wave that passes over the absorber carpet causes a movement of the absorber carpet, thereby operating one or more of the plurality of pumps; (c) extracting wave energy from the one or more waves with the wave energy conversion apparatus through operation of one or more of the plurality of pumps.

52. The method of any preceding embodiment, wherein the wave energy conversion apparatus has a wave energy efficiency selected from a group of efficiencies consisting of: $\geq 70\%$, $\geq 80\%$, $\geq 90\%$, $\geq 95\%$, and $\geq 98$.

53. The method of any preceding embodiment, wherein the extracting the wave energy step comprises pumping a fluid via the one or more of the plurality of pumps.

54. The method of any preceding embodiment, wherein the fluid is a medium of the one or more waves.

55. The method of any preceding embodiment, wherein at least one of the ends of the absorber carpet comprises: (a) one or more transverse stiffeners attached to an elastic sheet along a transverse extent; (b) one or more fasteners that fastens the elastic sheet to the one or more transverse stiffeners; (c) one or more through holes that pass through the one or more transverse stiffeners, as well as through the elastic sheet; and (d) one or more turnbuckles attached to the through hole at one end, and substantially fixed to a frame at another end; (e) wherein the turnbuckle tensions the elastic sheet.

56. The method of any preceding embodiment, wherein one or more of the pumps are double acting.

57. The method of any preceding embodiment, wherein the absorber carpet comprises: (a) an elastic sheet comprising a longitudinal and a transverse extent; (b) one or more transverse stiffeners connected to the elastic sheet along the transverse extent; (c) one or more longitudinal members attached to at least two of the transverse stiffeners.

58. The method of any preceding embodiment, wherein the longitudinal members are slidably attached to at least two of the transverse stiffeners.

59. The method of any preceding embodiment, wherein the longitudinal members are selected from one or more of a group of members consisting of: a flexible member and a fiberglass bar.

60. The method of any preceding embodiment, wherein the transverse stiffeners are selected from one or more of a group of stiffeners consisting of: a bar, an aluminum slat, a stainless steel slat, a fiberglass bar, a plastic slat, and a wooden slat.

61. The apparatus of any preceding embodiment, wherein the elastic sheet is selected from a group of elastic materials comprising: a rubber, a polymer, and a material with a Young's modulus selected from a group of Young's moduli consisting of: $\leq 0.01$ GPa, $\leq 0.1$ GPa, and $\leq 0.3$ GPa.

62. The apparatus of any preceding embodiment, wherein the longitudinal member is selected from a group of materials having a Young's modulus consisting of: $\geq 1.0$ GPa, $\geq 3.0$ GPa, $\geq 10.0$ GPa, and $\geq 30.0$ GPa.

63. A wave energy conversion apparatus, comprising: (a) an absorber carpet comprising a first end and a second end; and (b) a plurality of pumps, each pump operatively coupled to the absorber carpet; (c) means for extracting energy from a wave that passes over the absorber carpet through operation of one or more of the plurality of pumps.

64. The apparatus of any preceding embodiment wherein at least one of the ends of the absorber carpet comprises: (a) one or more transverse stiffeners attached to an elastic sheet along a transverse extent; (b) one or more fasteners that fastens the elastic sheet to the one or more transverse stiffeners; (c) one or more through holes that pass through the one or more transverse stiffeners, as well as through the elastic sheet; and (d) one or more turnbuckles attached to the through hole at one end, and substantially fixed to a frame at another end; (e) wherein the turnbuckle tensions the elastic sheet.

65. The apparatus of any preceding embodiment, wherein one or more of the plurality of pumps are double acting.

66. The apparatus of any preceding embodiment, wherein the absorber carpet comprises: (a) an elastic sheet comprising a longitudinal and a transverse extent; (b) one or more transverse stiffeners connected to the elastic sheet along the transverse extent; (c) one or more longitudinal members attached to at least two of the transverse stiffeners.

67. The apparatus of any preceding embodiment, wherein the longitudinal members are slidably attached to at least two of the transverse stiffeners.

68. The apparatus of any preceding embodiment, wherein the longitudinal members are selected from one or more of a group of members consisting of: a flexible member and a fiberglass bar.

69. The apparatus of any preceding embodiment, wherein the transverse stiffeners are selected from one or more of a group of stiffeners consisting of: a bar, an aluminum slat, a stainless steel slat, a fiberglass bar, a plastic slat, and a wooden slat.

70. The apparatus of any preceding embodiment, wherein the elastic sheet is selected from a group of elastic materials comprising: a rubber, a polymer, and a material with a Young's modulus selected from a group of Young's moduli consisting of: $\leq 0.01$ GPa, $\leq 0.1$ GPa, and $\leq 0.3$ GPa.

71. The apparatus of any preceding embodiment, wherein the longitudinal member is selected from a group of materials having a Young's modulus consisting of: $\geq 1.0$ GPa, $\geq 3.0$ GPa, $\geq 10.0$ GPa, and $\geq 30.0$ GPa.

72. The apparatus of any preceding embodiment, wherein the means for extracting energy from the wave has a wave energy efficiency selected from a group of efficiencies consisting of: $\geq 70\%$, $\geq 80\%$, $\geq 90\%$, $\geq 95\%$, and $\geq 98\%$.

73. The apparatus of any preceding embodiment, wherein the means for extracting energy from the wave comprises: (a) a frame movably attached to the first and second ends of the absorber carpet; (b) one or more attachments to a floor of a body of water on a moored end, and to the frame on the other end.

74. The apparatus of any preceding embodiment, wherein the attachments allow for movement of the frame from the floor of the body of water to a surface of the body of water.

75. The apparatus of any preceding embodiment, wherein the means for extracting energy comprises: (a) a frame; (b) each pump movably attached to the frame at a frame end, and to the absorber carpet at a carpet end.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A wave energy conversion apparatus, comprising:
   (a) an absorber carpet comprising a first end and a second end; and
   (b) a plurality of energy converters, each energy converter coupled to the absorber carpet;
   (c) wherein an incoming wave that interacts with the absorber carpet causes a movement of the absorber carpet, thereby operating one or more of the plurality of energy converters; and
   (d) wherein at least one of the ends of the absorber carpet comprises:
      (i) one or more transverse stiffeners attached to an elastic sheet along a transverse extent;
      (ii) one or more fasteners that fastens the elastic sheet to the one or more transverse stiffeners;
      (iii) one or more through holes that pass through the one or more transverse stiffeners, as well as through the elastic sheet; and
      (iv) one or more turnbuckles attached to the one or more through holes at one end, and substantially fixed to a frame at another end;
      (v) wherein the one or more turnbuckles tension the elastic sheet.

2. The apparatus of claim 1, wherein
the elastic sheet is tensioned by a preloaded stretch of the elastic sheet as it is attached to the frame.

3. The apparatus of claim 1, wherein the absorber carpet comprises a material selected from a group of materials consisting of: a flexible material; a water impermeable flexible material; a rubber; a urethane; a polyvinyl chloride; an acrylonitrile butadiene styrene (ABS); a nylon; and a polyoxymethylene.

4. The apparatus of claim 1, wherein one or more of the plurality of energy converters are selected from a group of energy converters consisting of: a single action hydraulic pump; a double action hydraulic pump; a linear electrical generator; a rack and pinion that drives a generator; and a rack and pinion that drives an alternator.

5. The apparatus of claim 1, wherein one or more of the plurality of energy converters directly pressurizes a source water for reverse osmosis purification of the source water into a purified water output.

6. The apparatus of claim 1, wherein the one or more transverse stiffeners comprise at least two transverse stiffeners, the elastic sheet has a longitudinal extent, and the absorber carpet comprises
one or more longitudinal members attached to at least two of the transverse stiffeners.

7. The apparatus of claim 6, wherein the one or more longitudinal members are slidably attached to at least two of the transverse stiffeners.

8. The apparatus of claim 6, wherein the at least two transverse stiffeners are selected from a group of stiffeners consisting of: a bar; a metal slat; a stainless steel slat; an epoxy slat; a fiberglass slat; a carbon fiber reinforced epoxy slat; a plastic slat; a composite slat; and a wooden slat.

9. The apparatus of claim 6, wherein the elastic sheet is selected from one or more of a group of elastic materials consisting of: a rubber; a polymer; an elastomer; and a material with a Young's modulus selected from a group of Young's moduli consisting of: ≤0.01 GPa, ≤0.1 GPa, ≤0.3 GPa, and ≤1.0 GPa.

10. The apparatus of claim 6, wherein the one or more longitudinal members are selected from a group of materials having a Young's modulus consisting of: ≥1.0 GPa, ≥3.0 GPa, ≥10.0 GPa, and ≥30.0 GPa.

11. The apparatus of claim 1, wherein the wave energy conversion apparatus has a wave absorption efficiency selected from a group of absorption efficiencies consisting of: ≥40%; ≥60%; ≥80%; ≥90%; and ≥98%.

12. A method of extracting wave energy, comprising:
   (a) providing one or more waves;
   (b) providing a wave energy conversion apparatus, comprising:
      (i) an absorber carpet comprising a first end and a second end; and
      (ii) a plurality of energy converters, each energy converter operatively coupled to the absorber carpet;
      (iii) wherein the wave that passes over the absorber carpet causes a movement of the absorber carpet, thereby operating one or more of the plurality of energy converters; and
   (c) extracting wave energy from the one or more waves with the wave energy conversion apparatus through operation of one or more of the plurality of energy converters;
   (d) wherein at least one of the ends of the absorber carpet comprises:
      (i) one or more transverse stiffeners attached to an elastic sheet along a transverse extent;
      (ii) one or more fasteners that fastens the elastic sheet to the one or more transverse stiffeners;
      (iii) one or more through holes that pass through the one or more transverse stiffeners, as well as through the elastic sheet; and
      (iv) one or more turnbuckles attached to the one or more through holes at one end, and substantially fixed to a frame at another end;
      (v) wherein the one or more turnbuckles tension the elastic sheet.

13. The method of claim 12, wherein the wave energy conversion apparatus has a wave energy efficiency selected from a group of efficiencies consisting of: ≥70%, ≥80%, ≥90%, ≥95%, and ≥98%.

14. The method of claim 12, wherein extracting the wave energy comprises driving one or more of the plurality of energy converters.

15. The method of claim 12, wherein the one or more waves substantially comprise fresh water or salt water.

16. The method of claim 12, wherein one or more of the plurality of energy converters are selected from a group of pumps consisting of: a single action hydraulic pump; a double action hydraulic pump; a linear electrical generator; a rack and pinion that drives a generator; and a rack and pinion that drives an alternator.

17. The method of claim 12, wherein the one or more transverse stiffeners comprise at least two transverse stiffeners, the elastic sheet has a longitudinal extent, and the absorber carpet comprises
   one or more longitudinal members attached to at least two of the transverse stiffeners.

18. The method of claim 17, wherein the one or more longitudinal members are slidably attached to at least two of the transverse stiffeners.

19. The method of claim 17, wherein the one or more longitudinal members are selected from one or more of a group of members consisting of: a flexible member and a fiberglass bar.

20. The method of claim 17, wherein the at least two transverse stiffeners are selected from a group of stiffeners consisting of: a bar; a metal slat; a stainless steel slat; an epoxy slat; a fiberglass slat; a carbon fiber reinforced epoxy slat; a plastic slat; a composite slat; and a wooden slat.

21. The method of claim 17, wherein the elastic sheet is selected from a group of elastic materials consisting of: a rubber, a polymer, and a material with a Young's modulus selected from a group of Young's moduli consisting of: ≤0.01 GPa, ≤0.1 GPa, ≤0.3 GPa, and ≤1.0 GPa.

22. The method of claim 17, wherein the one or more longitudinal members are selected from a group of materials having a Young's modulus consisting of: ≥1.0 GPa, ≥3.0 GPa, ≥10.0 GPa, and ≥30.0 GPa.

23. A wave energy conversion apparatus, comprising:
   (a) an absorber carpet comprising a first end and a second end;
   (b) a plurality of energy converters, each energy converter coupled to the absorber carpet; and
   (c) means for extracting energy from a wave that interacts with the absorber carpet through operation of one or more of the plurality of energy converters;
   (d) wherein at least one of the ends of the absorber carpet comprises:
      (i) one or more transverse stiffeners attached to an elastic sheet along a transverse extent;
      (ii) one or more fasteners that fastens the elastic sheet to the one or more transverse stiffeners;
      (iii) one or more through holes that pass through the one or more transverse stiffeners, as well as through the elastic sheet; and
      (iv) one or more turnbuckles attached to the one or more through holes at one end, and substantially fixed to a frame at another end;
      (v) where the one or more turnbuckles tension the elastic sheet.

24. The apparatus of claim 23, wherein one or more of the plurality of energy converters are selected from a group of energy converters consisting of: a single action hydraulic pump; a double action hydraulic pump; a linear electrical generator; a rack and pinion that drives a generator; and a rack and pinion that drives an alternator.

25. The apparatus of claim 23, wherein one or more of the plurality of energy converters directly pressurize a source of water for reverse osmosis purification of the source of water into a purified water output.

26. The apparatus of claim 23, wherein the one or more transverse stiffeners comprise at least two transverse stiffeners, the elastic sheet has a longitudinal extent, and the absorber carpet comprises
   one or more longitudinal members attached to at least two of the transverse stiffeners.

27. The apparatus of claim 26, wherein the one or more longitudinal members are slidably attached to at least two of the transverse stiffeners.

28. The apparatus of claim 26, wherein the one or more longitudinal members are selected from one or more of a group of members consisting of: a flexible member and a fiberglass bar.

29. The apparatus of claim 26, wherein the one or more longitudinal members are selected from a group of materials having a Young's modulus consisting of: $\geq 1.0$ GPa, $\geq 3.0$ GPa, $\geq 10.0$ GPa, and $\geq 30.0$ GPa.

30. The apparatus of claim 23, wherein the one or more transverse stiffeners are selected from a group of stiffeners consisting of: a bar, an aluminum slat, a stainless steel slat, a fiberglass bar, a plastic slat, and a wooden slat.

31. The apparatus of claim 23, wherein the elastic sheet is selected from a group of elastic materials consisting of: a rubber, a polymer, and a material with a Young's modulus selected from a group of Young's moduli consisting of: $\leq 0.01$ GPa, $\leq 0.1$ GPa, $\leq 0.3$ GPa, and $\leq 1.0$ GPa.

32. The apparatus of claim 23, wherein the one or more longitudinal members are selected from a group of materials having a Young's modulus consisting of: $\geq 1.0$ GPa, $\geq 3.0$ GPa, $\geq 10.0$ GPa, and $\geq 30.0$ GPa.

33. The apparatus of claim 23, wherein the means for extracting energy from the wave has a wave energy efficiency selected from a group of efficiencies consisting of: $\geq 70\%$, $\geq 80\%$, $\geq 90\%$, $\geq 95\%$, and $\geq 98\%$.

34. The apparatus of claim 23, wherein the means for extracting energy from the wave comprises:
   (a) the frame movably attached to the first and second ends of the absorber carpet;
   (b) one or more attachments to a moor point on a moored end, and to the frame on another end; and
   (c) the moor point selected from a group of moor points consisting of: a floor of a body of water; a platform connected to one or more footings in a floor of a body of water; and a floating platform.

35. The apparatus of claim 34:
   (a) wherein the one or more attachments allow for movement of the frame from below a surface of the body of water to the surface of the body of water; and
   (b) wherein the wave propagates within the body of water.

36. The apparatus of claim 23, wherein the means for extracting energy comprises
   one or more of the plurality of energy converters movably attached to the frame at a frame end, and to the absorber carpet at a carpet end.

* * * * *